(12) United States Patent
Yun

(10) Patent No.: US 9,863,481 B2
(45) Date of Patent: Jan. 9, 2018

(54) IMPACT ENERGY ABSORBING PROPELLER SHAFT

(71) Applicant: Hyundai Motor Company, Seoul (KR)

(72) Inventor: Jae Hyung Yun, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/977,255

(22) Filed: Dec. 21, 2015

(65) Prior Publication Data

US 2016/0290410 A1    Oct. 6, 2016

(30) Foreign Application Priority Data

Apr. 1, 2015 (KR) .................. 10-2015-0045883

(51) Int. Cl.
| | | |
|---|---|---|
| *F16C 3/03* | (2006.01) | |
| *F16D 3/06* | (2006.01) | |
| *B60K 17/22* | (2006.01) | |
| *F16D 1/10* | (2006.01) | |
| *B62D 1/19* | (2006.01) | |

(52) U.S. Cl.
CPC .............. *F16D 3/06* (2013.01); *B60K 17/22* (2013.01); *F16C 3/03* (2013.01); *B62D 1/192* (2013.01); *F16D 1/101* (2013.01); *F16D 2001/103* (2013.01); *Y10S 403/03* (2013.01); *Y10T 403/11* (2015.01); *Y10T 403/7033* (2015.01)

(58) Field of Classification Search
CPC ........... B60K 17/12; B62D 1/192; F16C 3/08; F16D 1/101; F16D 3/06; F16D 2001/108; Y10S 403/03; Y10T 403/11; Y10T 403/7033

USPC ........................................ 464/182; 180/338
See application file for complete search history.

(56) References Cited

U.S. PATENT DOCUMENTS

| | | | | |
|---|---|---|---|---|
| 6,099,036 A | * | 8/2000 | Fujiu ................. | B62D 1/192 |
| | | | | 280/777 |
| 9,284,990 B2 | * | 3/2016 | Oh .................... | F16D 3/18 |

FOREIGN PATENT DOCUMENTS

| | | |
|---|---|---|
| JP | 2006-256610 A | 9/2006 |
| JP | 2008-155778 A | 7/2008 |
| KR | 10-2005-0005103 A | 1/2005 |
| KR | 10-2008-0026352 A | 3/2008 |
| KR | 10-2010-0060378 A | 6/2010 |
| KR | 20-2011-0000031 U | 1/2011 |
| KR | 10-1382838 B1 | 4/2014 |
| KR | 10-2014-0083331 A | 7/2014 |
| KR | 10-1459959 B1 | 11/2014 |

* cited by examiner

*Primary Examiner* — Gregory J Binda
(74) *Attorney, Agent, or Firm* — Morgan, Lewis & Bockius LLP

(57) ABSTRACT

An impact energy absorbing propeller shaft may include a collet integrally and rotatably inserted between a spline portion formed on an outer circumferential surface of a front shaft and a spline portion formed on an inner circumferential surface of a rear shaft, and an O-ring fitted with an outer circumferential surface of a rear end portion of the collet, fixedly holding a rear end portion of the front shaft, and fixedly supporting the collet inside the rear shaft.

5 Claims, 6 Drawing Sheets

IMPACT ENERGY ABSORBING PROPELLER SHAFT

CROSS-REFERENCE TO RELATED APPLICATION

The present application claims priority to Korean Patent Application No. 10-2015-0045883 filed Apr. 1, 2015, the entire contents of which is incorporated herein for all purposes by this reference.

BACKGROUND OF THE INVENTION

Field of the Invention

The present invention relates to an impact energy absorbing propeller shaft. More particularly, the present invention relates to an impact energy absorbing propeller shaft capable of absorbing and reducing impact energy at the time of a collision accident of a vehicle.

Description of Related Art

A propeller shaft mounted in a vehicle is a component that is positioned between a transmission (or transfer) and a rear differential of a vehicle to transmit power of an engine, and used to transmit power to rear wheels of a four-wheel-drive or rear-wheel-drive vehicle.

A general propeller shaft in the related art includes a front tube (or front shaft) which is connected, by means of a joint, to the transmission to which power of the engine is input, and a rear tube (or rear shaft) which is connected, by means of a joint, to the rear differential that transmits power to the rear wheel, and the front tube and the rear tube are connected by a constant velocity joint.

Recently, as safety in respect to a vehicle collision is considered important, various efforts have been devoted to reduce a collapse load of the propeller shaft and improve collision performance.

The propeller shaft, which serves to transmit power at normal times, is deformed by impact energy that is applied in an axial direction at the time of a collision accident in a front and rear direction of the vehicle, and damages the main components of the vehicle or causes an injury to a body of an occupant. Therefore, recently, a propeller shaft having a function of absorbing impact energy is applied to a number of vehicles in order to prevent damage to components and injuries to occupants at the time of a collision accident of the vehicle.

As the propeller shaft having a function of absorbing impact energy, a propeller shaft with a swaging tube structure is typically and mainly used.

FIG. 1 illustrates the propeller shaft with a swaging tube structure in the related art. The propeller shaft 1, similar to the related art, has a swaged tube portion 2 which is formed at one side of the propeller shaft 1 and has a diameter that is reduced by a swaging process. Therefore, the swaged tube portion 2 is pushed into a non-swaged tube portion 3 with a non-reduced diameter at the time of a collision accident, thereby absorbing impact energy.

However, the propeller shaft in the related art having the aforementioned function of absorbing impact energy has problems in that time and costs required to perform a process of forming the swaging tube structure are increased, and strength of the propeller shaft deteriorates due to stress concentration caused by plastic swaging processing.

In order to solve the above problems, a technology regarding a propeller shaft, which has a tube structure that is coupled by using a shear pin and allows the shear pin to be broken at the time of a collision so as to absorb impact energy, has been proposed in the related art.

However, the propeller shaft in the related art, which has the aforementioned function of absorbing impact energy at the time of a collision accident of the vehicle, is not satisfactory in terms of the number of components and a collapse load, and as a result, the continuous development of the propeller shaft is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an impact energy absorbing propeller shaft, in which a collet and an O-ring are provided between a front shaft and a rear shaft to doubly absorb impact energy at the time of a collision of a vehicle, thereby ensuring an optimum collapse load by improving a function of absorbing impact energy, and minimizing the number of components in comparison with the related art.

According to various aspects of the present invention, an impact energy absorbing propeller shaft may include a collet integrally and rotatably inserted between a spline portion formed on an outer circumferential surface of a front shaft and a spline portion formed on an inner circumferential surface of a rear shaft, and an O-ring fitted with an outer circumferential surface of a rear end portion of the collet, fixedly holding a rear end portion of the front shaft, and fixedly supporting the collet inside the rear shaft.

The collet may include an inner spline portion which may be formed on an inner circumferential surface of the collet and meshes with the spline portion of the front shaft, and an outer spline portion which may be formed on an outer circumferential surface of the collet and meshes with the spline portion of the rear shaft, and at a time of a collision of a vehicle, the front shaft may be moved to a rear side of the rear shaft while breaking the O-ring.

The collet may include a tapered portion which is formed at a rear end portion of the collet and tapered in an axial direction, and the tapered portion may have a plurality of slits so that the tapered portion is spread out and expands by the front shaft that is moved to a rear side of the rear shaft.

The collet may have a catching end which is formed at a front end portion of the collet and protrudes outward so as to prevent the collet from being moved to the rear end portion of the rear shaft.

A static load in an axial direction may be determined by strength of the O-ring, and the O-ring may have one or more notches for adjusting strength against an axial load.

The impact energy absorbing propeller shaft according to the present invention may sufficiently absorb a change in length in the axial direction with a small collapse load at the time of a collision accident of the vehicle, thereby sufficiently absorbing impact energy, and maximally reducing severity of an injury to a passenger.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
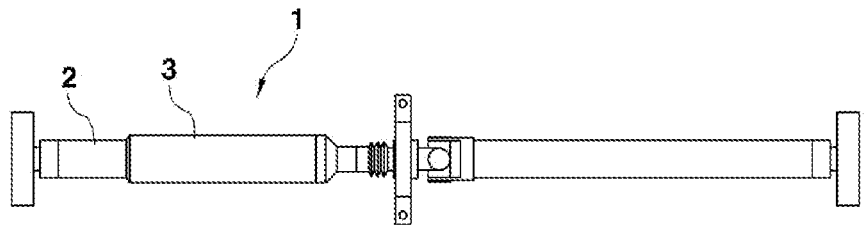
FIG. 1 is a view illustrating a propeller shaft with a swaging tube structure in the related art.
Figure 2:
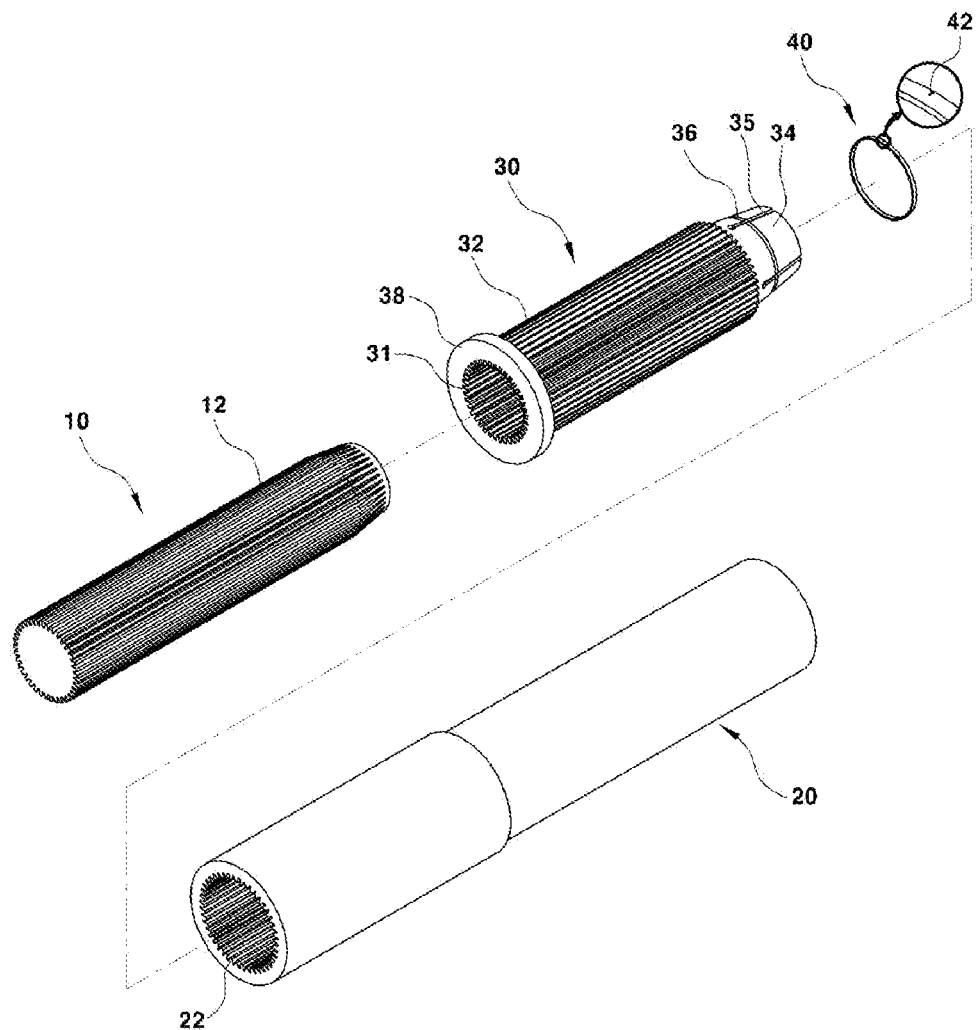
FIG. 2 is an exploded perspective view illustrating an exemplary propeller shaft according to the present invention.

As illustrated in FIGS. 2 and 3, a propeller shaft according to various embodiments of the present invention includes a front shaft 10, a rear shaft 20, a collet 30, and an O-ring 40.

The front shaft 10 is formed in a rod shape having a circular cross section, a spline portion 12, which extends in an axial direction, is formed on an outer circumferential surface of the front shaft 10, and a rear end portion of the front shaft 10, which is inserted into the collet 30, is tapered so that a diameter of the rear end portion of the front shaft 10 is decreased.

Figure 4:
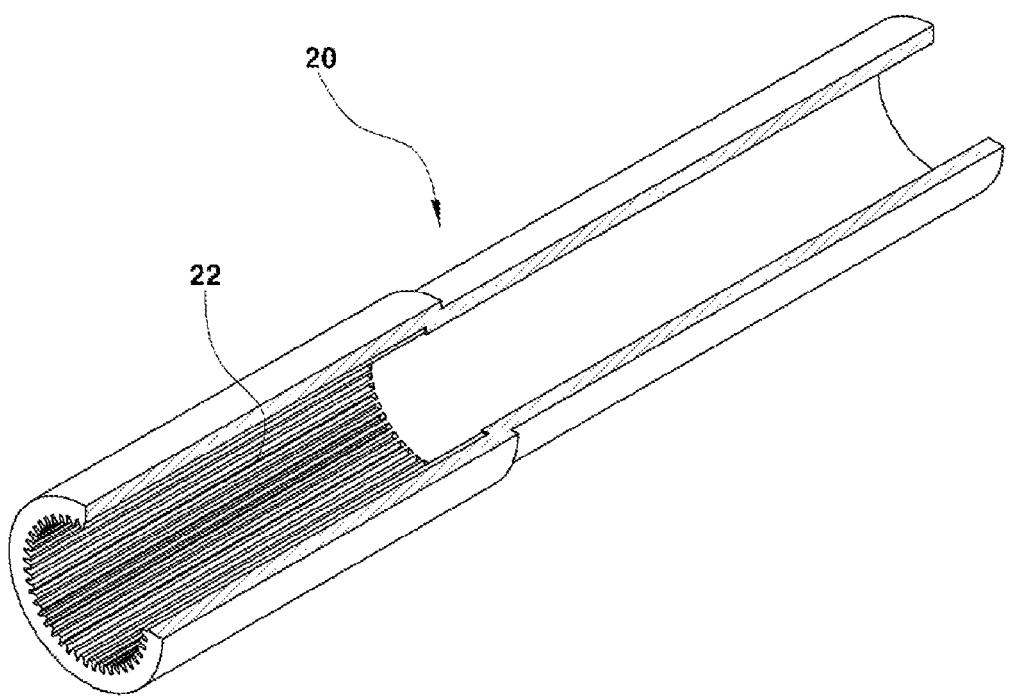
FIG. 4 is a cut-away perspective view illustrating a rear shaft of the exemplary propeller shaft according to the present invention.

The rear shaft 20 is formed in a pipe shape having a ring-shaped cross section, and as illustrated in FIG. 4, a spline portion 22, which extends in the axial direction, is formed on an inner circumferential surface of a front end portion of the rear shaft 20 into which the collet 30 is inserted.

Outer circumferential surfaces of the front end portion and a rear end portion of the rear shaft 20 are integrally connected in a stepped shape so that an outer diameter of the front end portion is greater than an outer diameter of the rear end portion, and based on teeth of the spline portion 22, the rear end portion has the same inner diameter as the front end portion, or has a smaller inner diameter than the front end portion.

Although not illustrated in the drawings, a front end portion of the front shaft 10 is coupled to a transmission by means of a joint, and the rear end portion of the rear shaft 20 is coupled to a rear differential by means of a joint.

Figure 5A:
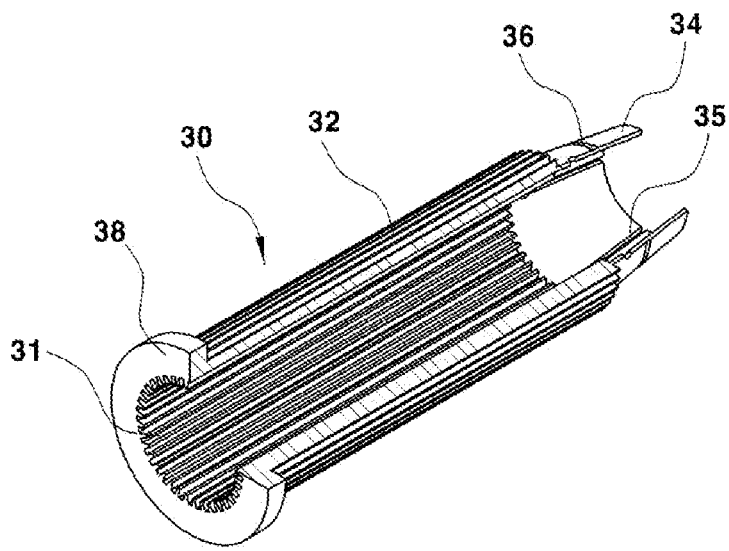
FIG. 5A and FIG. 5B are a cut-away perspective view and a side view illustrating a collet of the exemplary propeller shaft according to the present invention.
Figure 5B:
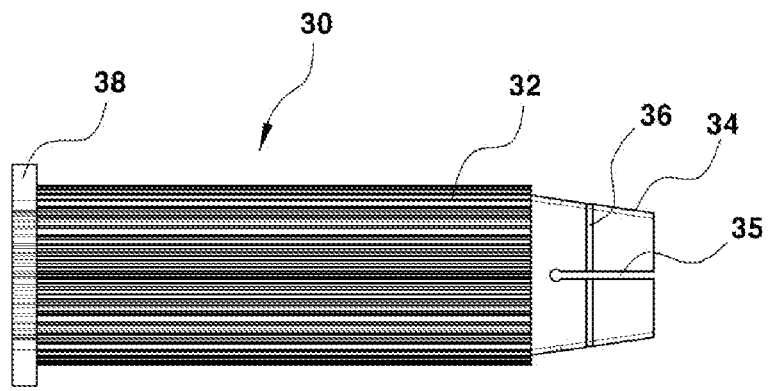

As illustrated in FIG. 2, FIG. 5A and FIG. 5B, the collet 30 is formed in a pipe shape having a nearly ring-shaped cross section, and inserted between the spline portion 12 of the front shaft 10 and the spline portion 22 of the rear shaft 20 so as to be integrally and rotatably coupled to the front shaft 10 and the rear shaft 20. To this end, an inner spline portion 31, which is matched with the spline portion 12 of the front shaft 10 so as to be coupled to the spline portion 12 of the front shaft 10, extends in the axial direction on an inner circumferential surface of a front end portion of the collet 30, and an outer spline portion 32, which is matched with the spline portion 22 of the rear shaft 20 so as to be coupled to the spline portion 22 of the rear shaft 20, extends in the axial direction on an outer circumferential surface of the front end portion of the collet 30.

A tapered portion 34, which is formed to be tapered so that an inner diameter thereof is gradually decreased in the axial direction, is formed at a rear end portion of the collet 30, and slits 35, which are cut in a narrow and elongated shape and extend in the axial direction, are formed in the tapered portion 34 in order to change the inner diameter of the tapered portion 34.

The plurality of slits 35 is formed to be spaced apart from each other along a circumference of the tapered portion 34 so that the tapered portion 34 may be spread out in a radial direction by a load so as to expand outward (to increase the inner diameter thereof) or the tapered portion 34 may be retracted in the radial direction so as to contract inward (to decrease the inner diameter thereof).

A catching end 38, which protrudes outward, is formed at an end of the front end portion of the collet 30 so as to extend perpendicular to the outer circumferential surface of the front end portion of the collet 30.

The catching end 38 serves to prevent the collet 30 from sliding and excessively entering the rear end portion of the rear shaft 20 when the vehicle travels or when a collision occurs.

Further, the tapered portion 34 has a ring groove 36 formed in an outer circumferential surface of the tapered portion 34 so that the O-ring 40 is fitted into and assembled to the ring groove 36 in a press-fit manner. In this case, a depth of the ring groove 36 is smaller than a thickness of the O-ring 40.

The O-ring 40 is a metal ring having a ring shape, and is press-fitted into the rear end portion of the rear shaft 20 in a state in which the O-ring 40 is fitted with (coupled to) the outer circumferential surface of the tapered portion 34 of the collet 30 into which the tapered rear end portion of the front shaft 10 is inserted, and the O-ring 40 serves to withstand a load in the axial direction which is applied to the propeller shaft.

The O-ring 40 fixedly holds (supports) the tapered rear end portion of the front shaft 10 which is spline-coupled to the inside of the collet 30, and prevents the front shaft 10 from being pushed in the axial direction when the vehicle normally travels. In addition, the O-ring 40 fixedly holds (supports) the collet disposed inside the rear shaft 20 which is spline-coupled to the outside of the collet 30, and prevents the collet 30 from being moved from a spline-coupled position when the vehicle normally travels (see FIG. 3).

That is, the O-ring 40 withstands the loads of the front shaft 10 and the rear shaft 20, which are applied in the axial direction, when the vehicle travels, thereby allowing power to be normally transmitted.

Figure 3A:
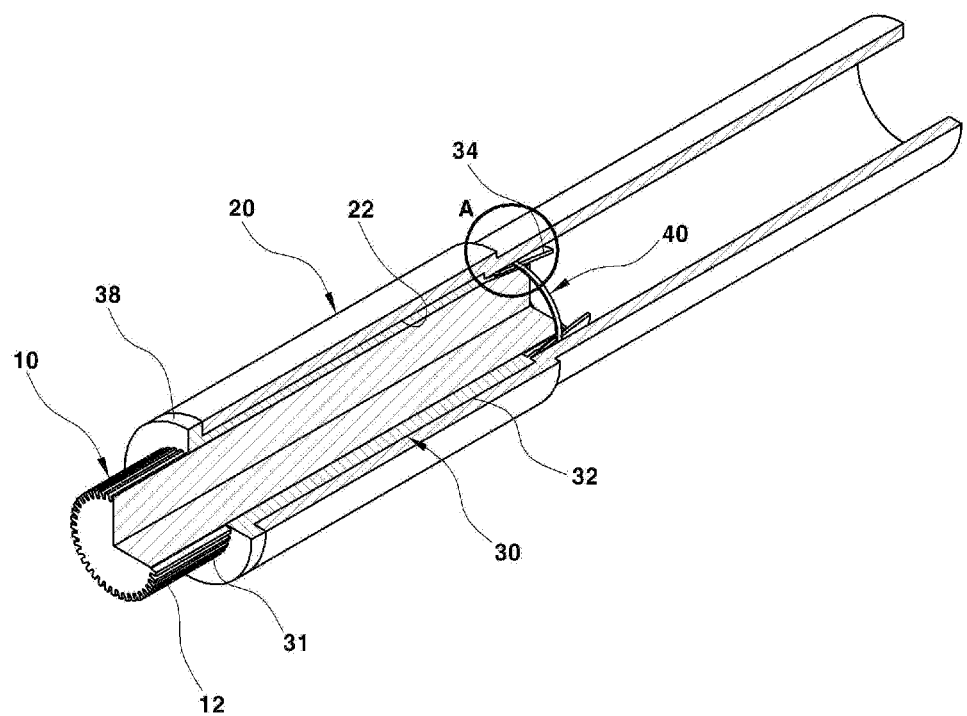
FIG. 3A is a cut-away perspective view illustrating the exemplary propeller shaft according to the present invention and FIG. 3B is an enlarged view of part A of FIG. 3A.
Figure 3B:
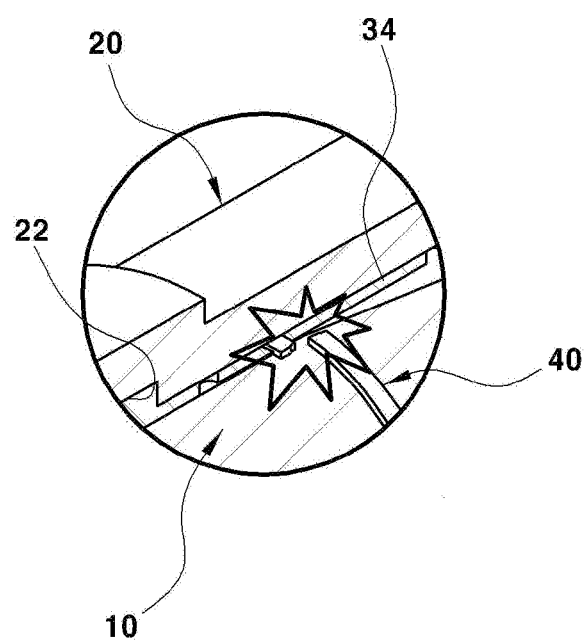

Strength of the O-ring 40 against a static load in the axial direction of the propeller shaft is determined through a strength design process that changes a thickness and the like, such that as shown in FIGS. 3A and 3B, the O-ring 40 is cut and broken by a load equal to or greater than the predetermined level of strength so that the front shaft 10 may be moved while allowing the tapered portion 34 of the collet 30 to expand in the radial direction.

Therefore, when an axial load equal to or greater than the predetermined level of strength is applied by the front shaft 10 that is moved rearward (toward the rear differential) at the time of a collision of the vehicle, the O-ring 40 is broken as shown in FIGS. 3A and 3B, to absorb impact energy, and in this case, the front shaft 10 is further inserted into the rear end portion of the rear shaft 20 while allowing the tapered portion 34 of the collet 30 to expand.

Figure 6:
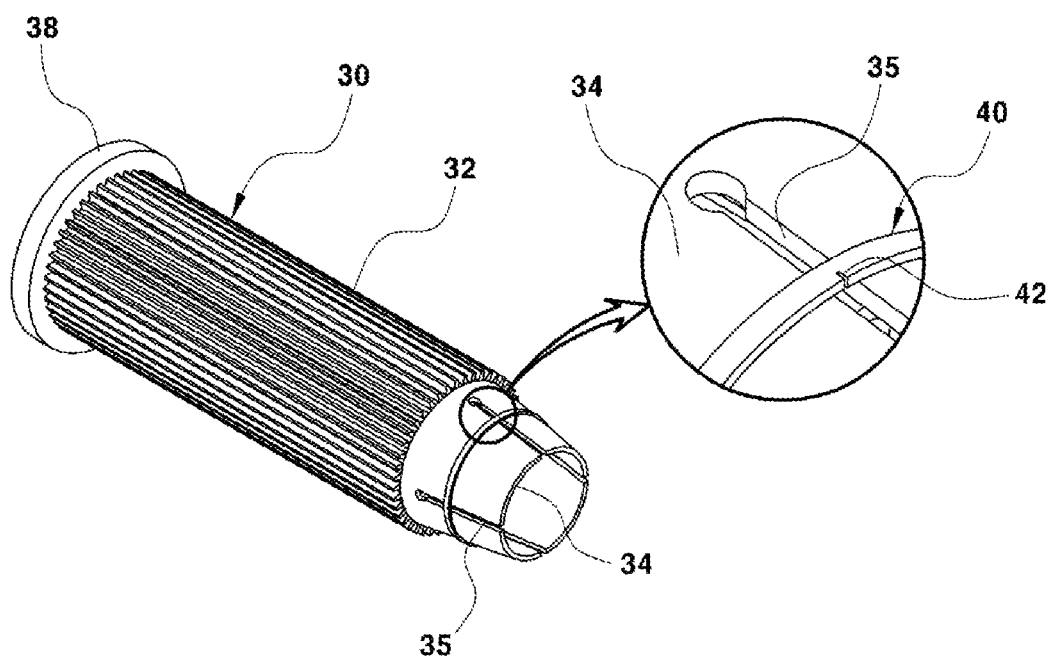
FIG. 6 is a perspective view illustrating a structure in which the collet and an O-ring of the exemplary propeller shaft according to the present invention are assembled.

As illustrated in FIG. 6, strength (load strength) of the O-ring 40 against the load applied in the axial direction may be adjusted by a notch 42 that is formed by partially cutting out one side of the O-ring 40. For example, the load strength may be adjusted by adjusting a size of the notch 42 and the number of notches 42 in accordance with the type of vehicle to which the propeller shaft is applied.

According to the propeller shaft that is configured as described above, at the time of a collision of the vehicle in the axial direction of the front shaft 10, the front shaft 10 is moved rearward toward the rear differential (not illustrated) to allow the tapered portion 34 of the collet 30 to expand, and as the front shaft 10 is further moved to the rear side of the rear shaft 20, the O-ring 40 is broken as shown in FIGS. 3A and 3B, to primarily absorb impact energy of the vehicle. In addition, the front shaft 10 further slides to the rear side of the rear shaft 20 by the spline-coupled structure with the collet 30 to secondarily absorb impact energy of the vehicle.

Here, functions of the respective constituent elements that constitute the propeller shaft of the present invention at normal times (when no collision occurs) and at the time of a collision will be described below.

First, with the spline engagement between the front shaft 10 and the rear shaft 20 by means of the collet 30, the front shaft 10 and the rear shaft 20 serve to transmit driving power from the transmission to the rear differential at normal times and when the vehicle normally travels. Further, when an impact load is transmitted due to a collision of the vehicle, the front shaft 10 disposed inside the collet 30 is moved rearward toward the rear differential to absorb impact energy.

The collet 30 is coupled between the front shaft 10 and the rear shaft 20 with the spline engagement, such that at normal times and when the vehicle normally travels, the collet 30, together with the front shaft 10 and the rear shaft 20, serves to transmit driving power from the transmission to the rear differential, and when an impact load is transmitted due to a collision of the vehicle, the front shaft 10, which is spline-coupled to the collet 30, is moved rearward toward the rear differential to absorb impact energy.

When an impact load is transmitted, the front shaft 10 passes through the inside of the tapered portion 34 of the collet 30, which is inclinedly formed at the rear end portion of the collet 30, to absorb impact energy, and with the structure in which the O-ring 40 is coupled to the outer circumferential surface of the tapered portion 34, the deviation of the front shaft 10 due to a load in the axial direction (the deviation of the front shaft, and the deviation from the rear shaft) is prevented while the vehicle travels.

Further, the O-ring 40 is inserted into the rear end portion of the rear shaft 20 in a state in which the O-ring 40 is coupled to the tapered portion 34 of the collet 30, and press-fitted between the tapered portion 34 and the rear shaft 20, such that at normal times and when the vehicle normally travels, the O-ring 40 performs a fail-safe function that prevents the front shaft 10, the rear shaft 20, and the collet 30 from deviating from the meshing position, and when an impact load equal to or greater than a predetermined load (or a predetermined load of the O-ring) is transmitted, the O-ring 40 is broken to guide the rearward movement of the front shaft 10 due to the deviation of the front shaft 10.

Strength of the O-ring 40 against a collision load may be changed to cope with the collision load by changing properties of the O-ring 40 such as a material and a shape. Further, the suitable load strength, which may cope with an axial load (axial load when the vehicle normally travels) according to the type of vehicle, may be created by the notch 42 formed in the O-ring 40.

Next, effects and advantages of the propeller shaft, which is configured as described above, will be described below.

The structure, which absorbs impact energy when an impact load is transmitted, is moved from the front side to the center of the front shaft 10, and as a result, it is possible to reduce the number of components and weights in comparison with the existing structure.

By eliminating the existing swaging structure, a diameter of the shaft may be easily designed in consideration of strength and natural frequency, and as a result, it is possible to optimize strength and natural frequency.

The collet 30 may be used as a mass damper by changing a length and a weight of the collet 30, and as a result, an additional mass is not required, thereby reducing costs and weights. In addition, weight distribution is possible by adjusting a shape and a length of the collet 30, and as a result, the collet 30 may be easily designed as the mass damper in consideration of natural frequency. In addition, the collet 30 may be used as a dynamic damper by changing a material of the collet 30, and as a result, it is possible to ensure a possibility to avoid natural frequency.

The collet 30 with a dual spline structure is used, and as a result, it is possible to reduce weights and material costs in comparison with the existing propeller shaft with the swaging structure.

The collet 30 may be variously used in accordance with torque, horse power, and a rotational speed (rpm) of the engine by changing the number of teeth of the spline portions 31 and 32 of the collet 30.

The front shaft 10 and the rear shaft 20 are integrally configured by using the collet 30, thereby reducing a weight of the structure and simplifying the structure.

The propeller shaft may be applied to various types of vehicles by replacing the collet 30, and as a result, platform integration is possible.

A collapse load at the time of a collision accident is decreased by using the spline-coupled structure that may be deformed in the axial direction, thereby improving collision performance.

Materials of the front shaft 10 and the rear shaft 20 may be individually changed, thereby reducing material costs and weights.

Safety performance may be ensured by controlling a collapse load of the collet 30.

It is possible to control a backlash by using the dual spline structure, thereby ensuring power transmission efficiency.

It is possible to ensure assembly properties for a manufacturer through separate assembly processes in comparison with the integrated front shaft in the related art.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An impact energy absorbing propeller shaft, comprising:
   a collet integrally and rotatably inserted between a spline portion formed on an outer circumferential surface of a front shaft and a spline portion formed on an inner circumferential surface of a rear shaft; and
   an O-ring fitted with an outer circumferential surface of a rear end portion of the collet, fixedly holding a rear end portion of the front shaft, and fixedly supporting the collet inside the rear shaft.

2. The impact energy absorbing propeller shaft of claim 1, wherein the collet includes:
   an inner spline portion which is formed on an inner circumferential surface of the collet and meshes with the spline portion of the front shaft; and
   an outer spline portion which is formed on an outer circumferential surface of the collet and meshes with the spline portion of the rear shaft, and
   wherein at a time of a collision of a vehicle, the front shaft is moved to a rear side of the rear shaft while breaking the O-ring.

3. The impact energy absorbing propeller shaft of claim 1, wherein the collet has a tapered portion which is formed at a rear end portion of the collet and tapered in an axial direction, and the tapered portion has a plurality of slits so that the tapered portion is spread out and expands by the front shaft that is moved to a rear side of the rear shaft.

4. The impact energy absorbing propeller shaft of claim 1, wherein the collet includes a catching end which is formed at a front end portion of the collet and protrudes outward so as to prevent the collet from being moved to the rear end portion of the rear shaft.

5. The impact energy absorbing propeller shaft of claim 1, wherein a static load in an axial direction is determined by strength of the O-ring, and the O-ring has one or more notches for adjusting strength against an axial load.

\* \* \* \* \*